US008188712B2

(12) United States Patent
Sato et al.

(10) Patent No.: US 8,188,712 B2
(45) Date of Patent: May 29, 2012

(54) POWER SUPPLY CONTROLLER AND MECHANICAL APPARATUS USING THE SAME

(75) Inventors: Chihiro Sato, Kasama (JP); Mitsuhiko Watanabe, Odawara (JP); Ko Moriya, Hitachinaka (JP); Hirofumi Kurimoto, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 771 days.

(21) Appl. No.: 12/332,763

(22) Filed: Dec. 11, 2008

(65) Prior Publication Data

US 2009/0153118 A1 Jun. 18, 2009

(30) Foreign Application Priority Data

Dec. 12, 2007 (JP) .................................. 2007-320828

(51) Int. Cl.
*H02J 7/00* (2006.01)
*H02J 7/14* (2006.01)
(52) U.S. Cl. ........ 320/110; 320/123; 320/125; 320/137; 320/138
(58) Field of Classification Search .................. 320/110, 320/123, 125, 137, 138
See application file for complete search history.

(56) References Cited

U.S. PATENT DOCUMENTS

| 4,618,812 | A | 10/1986 | Kawakami |
| 5,309,082 | A | 5/1994 | Payne |
| 2006/0262579 | A1 | 11/2006 | Chou |

FOREIGN PATENT DOCUMENTS

| JP | 6-168043 A | 6/1994 |
| JP | 2002-112534 A | 4/2002 |
| JP | 2004-129350 A | 4/2004 |
| JP | 2004-364404 A | 12/2004 |

OTHER PUBLICATIONS

Japanese Office Action with partial English translation dated Aug. 17, 2011 (four (4) pages), JP2007-320328.
European Search Report dated Jan. 31, 2011 (Three (3) pages), EP08021539.

*Primary Examiner* — Reena Aurora
(74) *Attorney, Agent, or Firm* — Crowell & Moring LLP

(57) ABSTRACT

There is a need for improving switching regulator characteristics and providing a stable power supply controller. The power supply controller uses a battery and either or both functions of stepping up and stepping down a battery voltage. The power supply controller includes a means that prevents a ripple voltage from occurring by stopping the up conversion function for a switching operation in connection with a battery during a predetermined period without changing conditions for a conventional switching device or smoothing circuit and fast stabilizes a primary voltage using only the down conversion function.

19 Claims, 20 Drawing Sheets

POWER SUPPLY CONTROLLER AND MECHANICAL APPARATUS USING THE SAME

CLAIM OF PRIORITY

The present application claims priority from Japanese patent application serial No. 2007-320828 filed on Dec. 12, 2007, the content of which is hereby incorporated by reference into this application

BACKGROUND OF THE INVENTION

1. Field of the Invention

The present invention relates to a power supply controller used for a device control circuit of electric equipment in a mechanical apparatus such as a car.

2. Description of the Related Art

A power supply controller supplies a drive voltage to a control circuit for electric devices mounted on a mechanical apparatus such as a car by generating a specific operating voltage such as 5 V or 3.3 V from a battery voltage. However, there is an increasing request from customers for ensuring operations against a battery voltage drop when an engine starts. To satisfy this demand, there is a need for a power supply controller featuring both an up conversion function and a down conversion function.

FIG. 18 shows a conventional example of the power supply controller. In FIG. 18, a battery 1 is connected to a smoothing circuit 4. A pulse width modulation (PWM) control section 9 includes a down conversion control circuit 9a and an up conversion control circuit 9b. The down conversion control circuit 9a drives a switching device for down conversion 3. The up conversion control circuit 9b drives a switching device for up conversion 5. The battery generates a primary voltage 6 using the switching device for down conversion 3 and the switching device for up conversion 5. The smoothing circuit 4 includes diodes 4a and 4c, an inductor 4b, and a capacitor 4d.

In order to decrease an effect of battery voltage variation, the PWM control section 9 allows a reference voltage generation circuit 10 to generate a reference voltage 10a from the battery voltage 1a or the primary voltage 6 whichever is higher. The battery voltage 1a passes through a voltage divider 18 and is supplied to a voltage comparator for battery voltage monitoring 14. The voltage comparator for battery voltage monitoring 14 compares the battery voltage 1a with an up conversion switching voltage 16a and a down conversion switching voltage 16b (16a<16b) predetermined in an up/down conversion switching voltage setting circuit 16 for determination. The voltage comparator for battery voltage monitoring 14 outputs battery voltage monitoring information 14a after the determination. An up/down conversion switching circuit 15 processes the battery voltage monitoring information 14a and notifies up/down conversion switching information 15a to the down conversion control circuit 9a and the up conversion control circuit 9b in the PWM control section 9.

The primary voltage 6 passes through the voltage divider 8 and is supplied to the voltage comparator for primary voltage monitoring 7. The voltage comparator for primary voltage monitoring 7 compares the primary voltage 6 with the reference voltage to detect a level of the primary voltage 6. An output 7a is fed back to the PWM control section 9 for generating the primary voltage that is modified by controlling the switching device for down conversion 3 or the switching device for up conversion 5.

FIG. 19 shows operational waveforms of the signals in FIG. 18 when the power is turned on. Normally, the battery voltage 1a increases when the battery 1 is connected to the power supply controller at timing 300. The reference voltage 10a generated from the battery voltage 1a also increases as indicated by reference numeral 304. When the reference voltage 10a reaches a predetermined value, the up/down conversion switching information 15a outputs 0 (down conversion control notification). The down conversion control circuit 9a starts stepping down the primary voltage 6.

The voltage comparator for battery voltage monitoring 14 monitors a voltage based on the battery voltage 1a and the reference voltage 10a and may incorrectly determine detection of the up conversion switching voltage 16a while the battery voltage 1a or the reference voltage 10a is in a increasing process as indicated by reference numeral 301. At this time, the up/down conversion switching information 15a outputs 1 (up conversion control notification). The up conversion control circuit 9b of the PWM control section 9 operates and supplies a large current to the battery smoothing circuit 4 to increase the primary voltage 6.

A large current may occur while the battery voltage 1a is in a increasing process and the reference voltage generation circuit 10 is in a generating process of the reference voltage 10a. In such case, the voltage decreases due to the impedance of a battery connection cable, causing a local decrease in the reference voltage 10a as indicated by reference numeral 305. The decrease of the battery voltage 1a causes the voltage comparator for battery voltage monitoring 14 to incorrectly determine detection of the down conversion switching voltage 16b. The up/down conversion switching information 15a outputs 0 (down conversion control notification) to stop the up conversion control circuit 9b of the PWM control section 9 and operate the down conversion control circuit 9a. The down conversion control decreases the current to the battery 1, stops decreasing the voltage due to the cable, and increases the battery voltage 1a.

The voltage comparator for battery voltage monitoring 14 may become incapable of correctly monitoring the battery-voltage 1a while the battery voltage 1a is in a increasing process as indicated by reference numeral 302 and the reference voltage generation circuit 10 is in a generating process of the reference voltage 10a as indicated by reference numeral 304. As a result, the up conversion control circuit 9b and the down conversion control circuit 9a repeatedly switch between down and up conversion operations based on the incorrect determination to increase and decrease a current from the battery 1 and ripple the battery voltage 1a. The up/down conversion switching information 15a causes an unstable up/down conversion switching state as indicated by reference numeral 307 while the battery voltage 1a is in the increasing process as indicated by reference numeral 302. The switching device for up conversion 5 erratically operates to abnormally increase the primary voltage 6 as indicated by reference numeral 308.

FIG. 20 shows operational waveforms corresponding to the following. The battery voltage 1a steps down to the up conversion switching voltage 16a specified by the up/down conversion switching voltage setting circuit 16. The PWM control section changes from the down conversion operation to the up conversion operation to recover the battery voltage 1a to the down conversion switching voltage 16b or higher.

At timing 401, the battery voltage 1a is lower than the up conversion switching voltage 16a. The voltage comparator for battery voltage monitoring 14 causes output of the up/down conversion switching information 15a set to 1 (up conversion control notification). The up conversion control circuit 9b operates to generate the primary voltage 6. The up conversion control circuit 9b in the PWM control section 9 controls the switching device for up conversion 5 to stepwise increase a current from the battery 1. The battery voltage 1a ripples due to an impedance of a connected harness.

During the ripple under the up conversion control, the battery voltage 1a recovers and reaches the down conversion switching voltage 16b at a time point 403. The up/down conversion switching information 15a of the up/down conversion switching circuit 15 outputs 0 (down conversion control notification). However, the battery voltage 1a still ripples under control of the up conversion control circuit 9b and becomes lower than the up conversion switching voltage 16a again. The up/down conversion switching information 15a outputs 1 (up conversion control notification).

A specified hysteresis voltage width is provided between the up conversion switching voltage 16a and the down conversion switching voltage 16b. However, the rippling battery voltage 1a makes an up/down conversion switching operation unstable near the down conversion switching voltage 16b or the up conversion switching voltage 16a as indicated by timing 403. The up conversion control circuit 9b in the PWM control section 9 does not generate a normal control pulse. The erratically generated up/down conversion switching information 15a passes control to the switching device for up conversion 5. The primary voltage 6 abnormally rises as indicated by reference numeral 405.

FIG. 21 shows operational waveforms when the battery is removed from the power supply controller. The battery voltage 1a decreases when the battery 1 is removed at timing 501. The battery voltage 1a is lower than the up conversion switching voltage 16a at timing 502. The voltage comparator for battery voltage monitoring 14 causes output of the up/down conversion switching information 15a set to be 1 (up conversion control notification). The up conversion control circuit 9b operates to generate the primary voltage 6.

When the battery voltage 1a further decreases to point 503, the decrease exceeds a limit that can be controlled by the up conversion control circuit 9b in the PWM control section 9. Accordingly, the primary voltage 6 decreases. The reference voltage 10a also decreases. The voltage comparator for battery voltage monitoring 14 or the voltage comparator for primary voltage monitoring 7 cannot correctly monitor voltage. Since the battery voltage 1a ripples due to the up conversion control, the reference voltage 10a becomes unstable as indicated by reference numeral 504. Consequently, the up/down conversion switching information 15a also becomes unstable as indicated by reference numeral 505. Control is passed to the switching device for up conversion 5 at an incorrect timing. The primary voltage 6 abnormally rises as indicated by reference numeral 506.

As a conventional solution, Patent Document 1 discloses a method of stabilizing linear voltage characteristics by supplying a linear regulator circuit and a switching regulator circuit with a stable reference voltage generated from another system.

Patent Document: JP-A No. 168043/1994

Recently, there is an increasing demand for ensuring operations at a low battery voltage. A power supply controller is requested to ensure operations of circuits using a battery even when a battery voltage drops due to a cranking noise generated during starter activation. Specifically, operations are requested to be ensured even when the battery voltage becomes lower than a primary voltage generated by a switching regulator. According to a conventional technology, voltage monitoring circuits cannot monitor the battery voltage while the battery voltage is increasing. An incorrect up/down conversion switching operation is repeated to abnormally increase the primary voltage 6.

SUMMARY OF THE INVENTION

To solve the above-mentioned problem, it is an object of the present invention to generate a primary voltage by operating a switching regulator only under down conversion control by using a means for disabling up conversion control until a battery voltage increases to stable a reference voltage. It is another object of the present invention to compare a secondary voltage generated from a primary voltage with a reference voltage, prevent incorrect up/down conversion switching control from occurring, and prevent a primary voltage from abnormally rising by using a means for forcibly masking an up conversion control operation until the secondary voltage reaches a regulation value.

It is still another object of the present invention to prevent incorrect up/down conversion switching control due to a battery voltage ripple occurring during engine startup and prevent a primary voltage from abnormally rising by providing a given hysteresis width for a changeover voltage around a voltage at which the battery voltage recovers and down conversion control is enabled.

It is yet another object of the present invention to prevent incorrect up/down conversion switching control from occurring and prevent a primary voltage from abnormally rising by using a means for forcibly disabling an up conversion control operation when the battery voltage decreases to or lower than a voltage capable of stepping up.

According to the present invention, a means for disabling up conversion control is used to forcibly stop an up conversion control operation until a battery voltage increases and a reference voltage is stabled. A switching regulator is operated only under down conversion control. The down conversion control is provided until a primary voltage is generated and a secondary voltage reaches a regulation value, preventing incorrect up/down conversion switching control from occurring and preventing the primary voltage from abnormally rising. It is possible to prevent an overcurrent from occurring and stably provide the primary voltage.

DETAILED DESCRIPTION OF THE PREFERRED EMBODIMENTS

Embodiments of the present invention will be described in further detail with reference to the accompanying drawings. The invention is not limited to the embodiments.

First Embodiment

Figure 1:
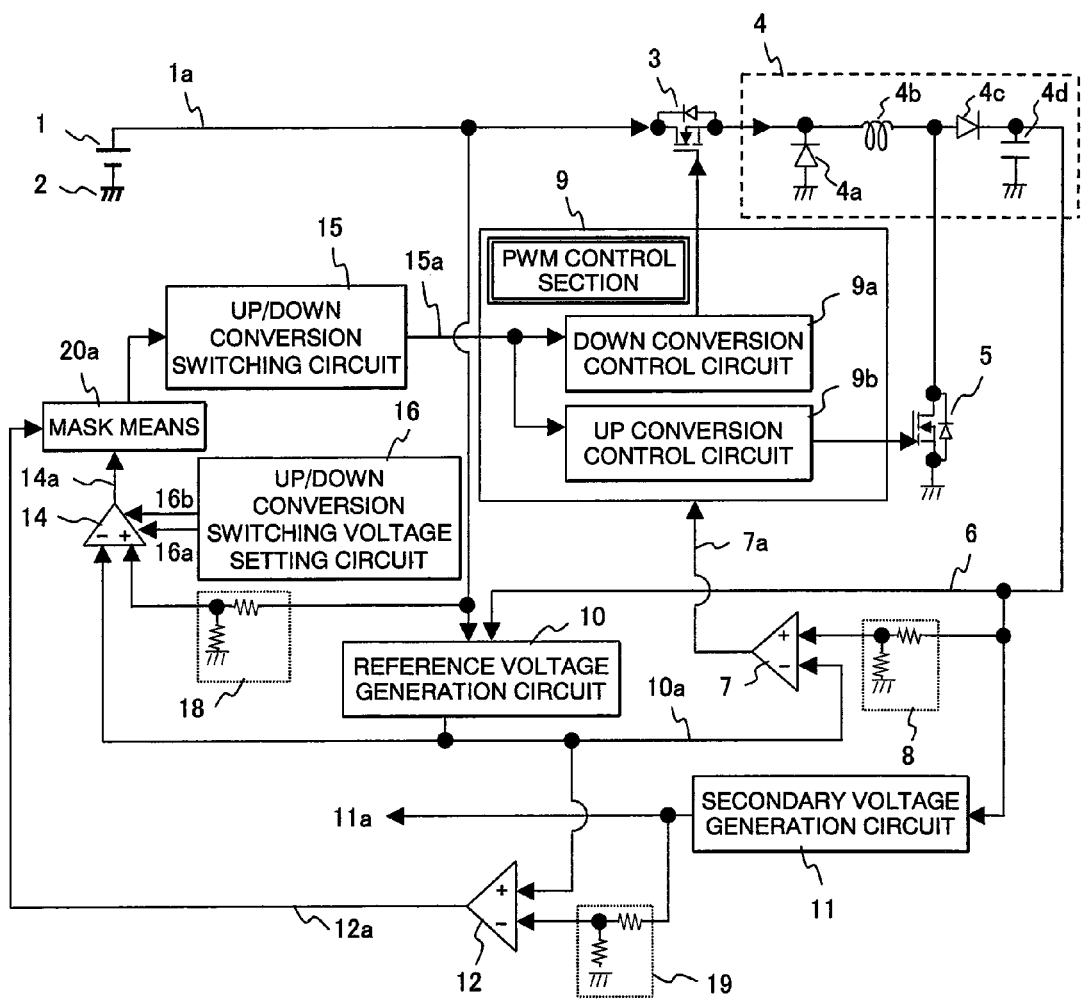
FIG. 1 is a circuit diagram showing a first embodiment of the invention.

FIG. 1 shows a first embodiment of the invention. A battery voltage 1a is connected to a smoothing circuit 4 via a switching device for down conversion 3. The switching device for down conversion 3, a switching device for up conversion 5, and a PWM control section 9 are used for up conversion control and down conversion control to generate a primary voltage. The smoothing circuit 4 includes diodes 4a and 4c, an inductor 4b, and a capacitor 4d using the same devices as used for the prior art.

The PWM control section 9 allows a reference voltage generation circuit 10 to generate a reference voltage 10a from the battery voltage 1a or the primary voltage whichever is higher. A battery voltage detection means includes a voltage comparator for battery voltage monitoring 14 and an up/down conversion switching voltage setting circuit 16. The battery voltage 1a is supplied to the voltage comparator for battery voltage monitoring 14 via a voltage divider 18 for determining an up conversion switching voltage 16a and a down conversion switching voltage 16b specified by the up/down conversion switching voltage setting circuit 16. A hysteresis is provided between the up conversion switching voltage 16a and the down conversion switching voltage 16b for stabilizing a detection circuit. The up/down conversion switching voltage setting circuit 16 can assign any values to the voltages 16a and 16b. The voltage comparator for battery voltage monitoring 14 outputs battery voltage monitoring information 14a as a determination result. The battery voltage monitoring information 14a passes through a mask means 20a. An up/down conversion switching circuit 15 notifies the battery voltage monitoring information 14a to a down conversion control circuit 9a and an up conversion control circuit 9b in the PWM control section 9.

The primary voltage 6 passes through a voltage divider 8 and is supplied to a voltage comparator for primary voltage monitoring 7 that detects a level. The voltage comparator for primary voltage monitoring 7 feeds primary voltage monitoring information 7a back to the PWM control section 9. The PWM control section 9 controls a switching regulator including the switching device for down conversion 3 or the switching device for up conversion 5 to generate a primary voltage.

The primary voltage 6 is generated from the switching regulator for providing a voltage to each device control circuit. A secondary voltage generation circuit 11 is used to generate a secondary voltage 11a from the primary voltage 6. The generated secondary voltage 11a passes through the voltage divider 19 and is supplied to a voltage comparator for secondary voltage monitoring 12. The voltage comparator for secondary voltage monitoring 12 compares the secondary voltage 11a with the reference voltage 10a to determine whether or not the secondary voltage 11a is greater than or equal to a regulation value. The voltage comparator for secondary voltage monitoring 12 outputs secondary voltage monitoring information 12a. The secondary voltage monitoring information 12a is connected to the mask means 20a. The mask means 20a forcibly masks the up/down conversion switching operation of the up/down conversion switching circuit 15 while the secondary voltage does not reach the regulation value. The mask forcibly stops control to be passed to the switching device for up conversion 5 and prevents the primary voltage 6 from abnormally rising.

The battery voltage detection means can include a proper circuit means. Using a secondary voltage monitoring signal 12a, the battery voltage detection means directly controls and stops the voltage comparator for battery voltage monitoring 14 until the secondary voltage reaches the regulation value. This operation similarly stops control to be passed to the switching device for up conversion 5 and prevents the primary voltage 6 from abnormally rising.

Second Embodiment

Figure 2:
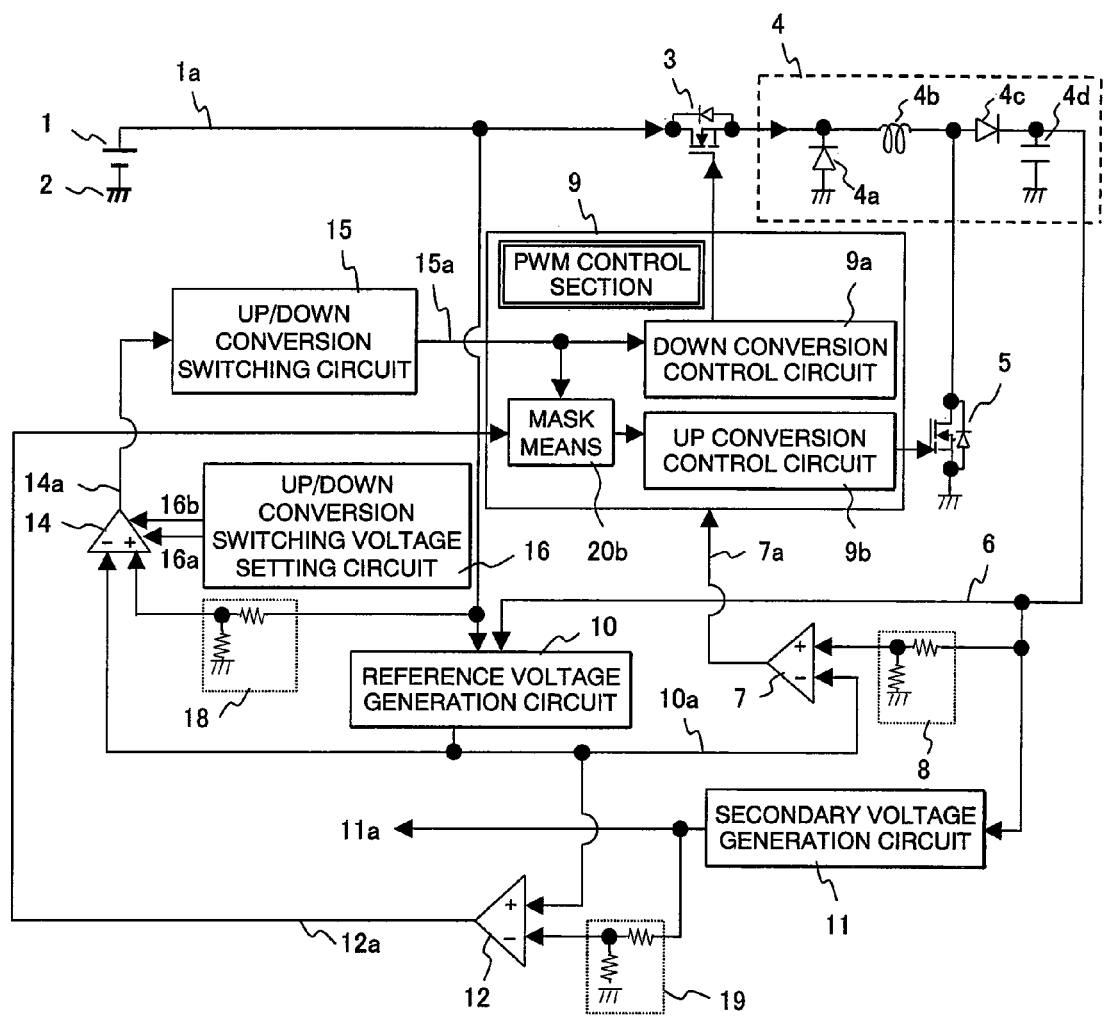
FIG. 2 is a circuit diagram showing a second embodiment of the invention.

FIG. 2 shows a second embodiment of the invention. In FIG. 2, a mask means 20b precedes the up conversion control circuit 9b of the PWM control section 9. The mask means 20b forcibly masks an up conversion operation of the up conversion control circuit 9b until the secondary voltage monitoring signal 12a detects that the secondary voltage 11a reaches a regulation value.

Third Embodiment

Figure 3:
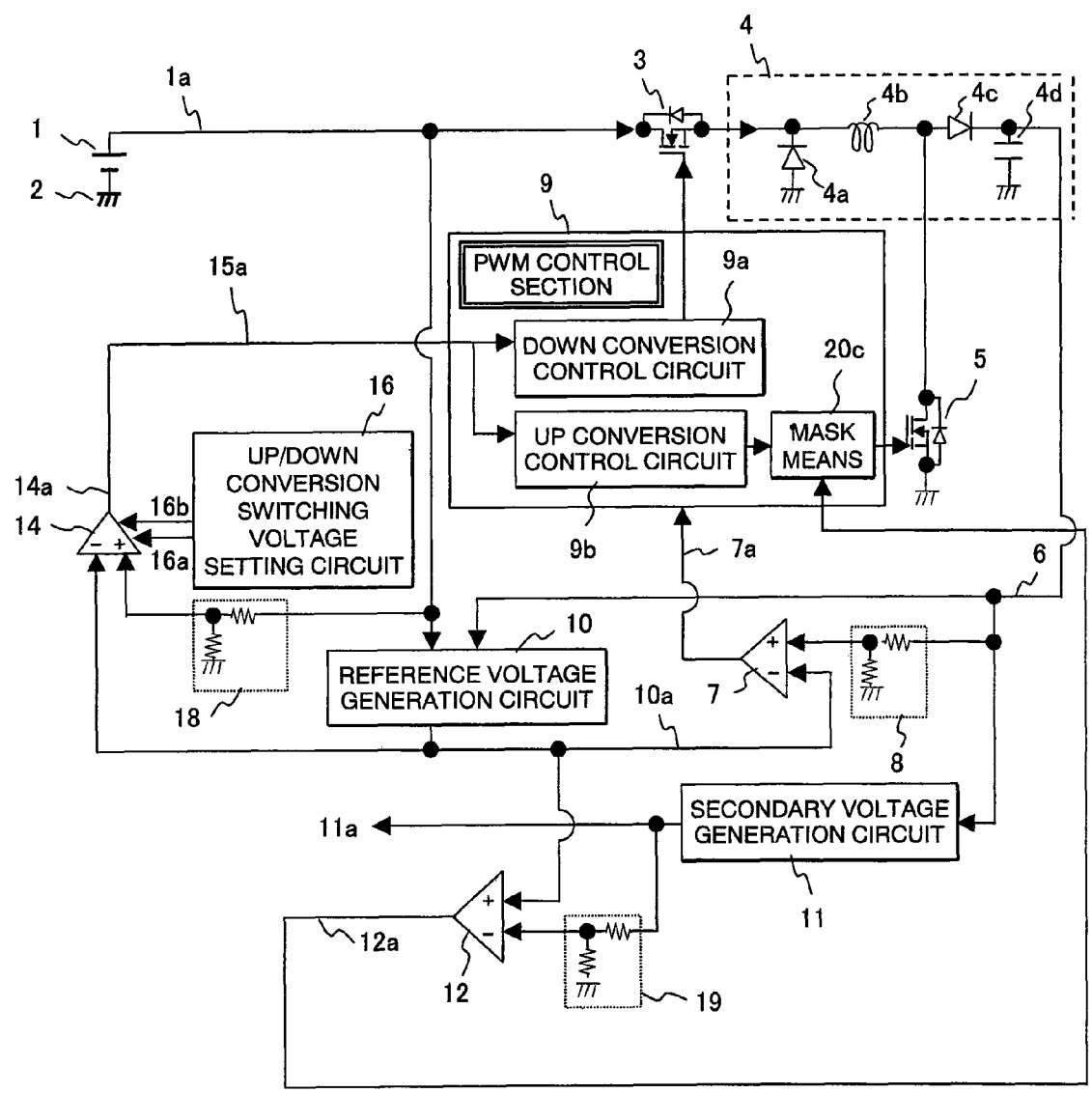
FIG. 3 is a circuit diagram showing a third embodiment of the invention.

FIG. 3 shows a third embodiment of the invention. In FIG. 3, a mask means 20c is provided between the up conversion control circuit 9b and the switching device for up conversion 5. Similarly to the second embodiment, the mask means 20c forcibly masks an up conversion operation of the switching device for up conversion 5 until the secondary voltage monitoring signal 12a detects that the secondary voltage 11a reaches a regulation value.

The embodiments describe only examples of the mask means and do not limit positions for installing the mask means.

Figure 4:
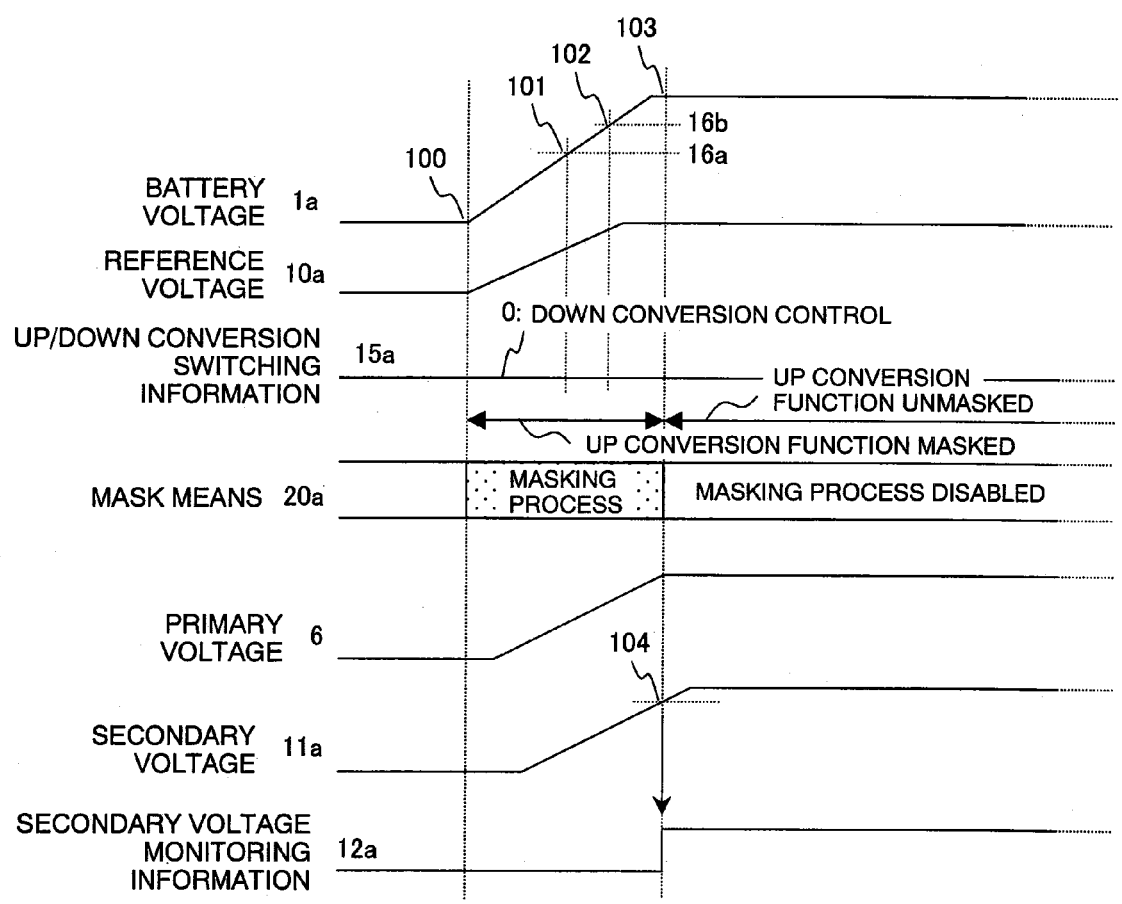
FIG. 4 is an operational waveform diagram according to the first embodiment of the invention.

FIG. 4 is an operational waveform diagram for voltages showing operations of a power control circuit according to the first embodiment. The operations of the first embodiment will be described with reference to FIG. 4. The battery 1 is connected to the power control circuit at timing 100. The battery voltage 1a increases to start increasing the reference voltage 10a that is generated from the battery voltage 1a. At this time, the secondary voltage 11a is equal to the reference voltage 10a and does not reach a regulation value 104. The PWM control section 9 uses the mask means 20a based on the secondary voltage monitoring information 12a to control the up/down conversion switching information 15a to be output as 0 (down conversion control notification) for generating the primary voltage 6.

The secondary voltage generation circuit 11 generates the secondary voltage 11a from the primary voltage 6 generated by the down conversion control circuit 9a. The voltage comparator for secondary voltage monitoring 12 transmits the secondary voltage monitoring information 12a output as 0 until the secondary voltage 11a reaches a value 104 specified by the reference voltage 10a. The voltage comparator for secondary voltage monitoring 12 transmits the secondary voltage monitoring information 12a output as 1 when the secondary voltage 11a exceeds the value 104 specified by the reference voltage 10a. The secondary voltage monitoring information 12a is used for controlling the up/down conversion switching information 15a.

These means increase both the battery voltage 1a and the reference voltage 10a until the battery voltage 1a reaches a voltage 103. After reaching a voltage 101, the battery voltage 1a exceeds the up conversion switching voltage 16a specified by the up/down conversion switching voltage setting circuit 16. When reaching a voltage 102, the battery voltage 1a exceeds the down conversion switching voltage 16b. At this time, a forcible down conversion control means is used to prevent an incorrect up/down conversion switching operation from occurring while the battery voltage 1a is increasing, thus preventing the primary voltage 6 from abnormally rising.

Figure 5:
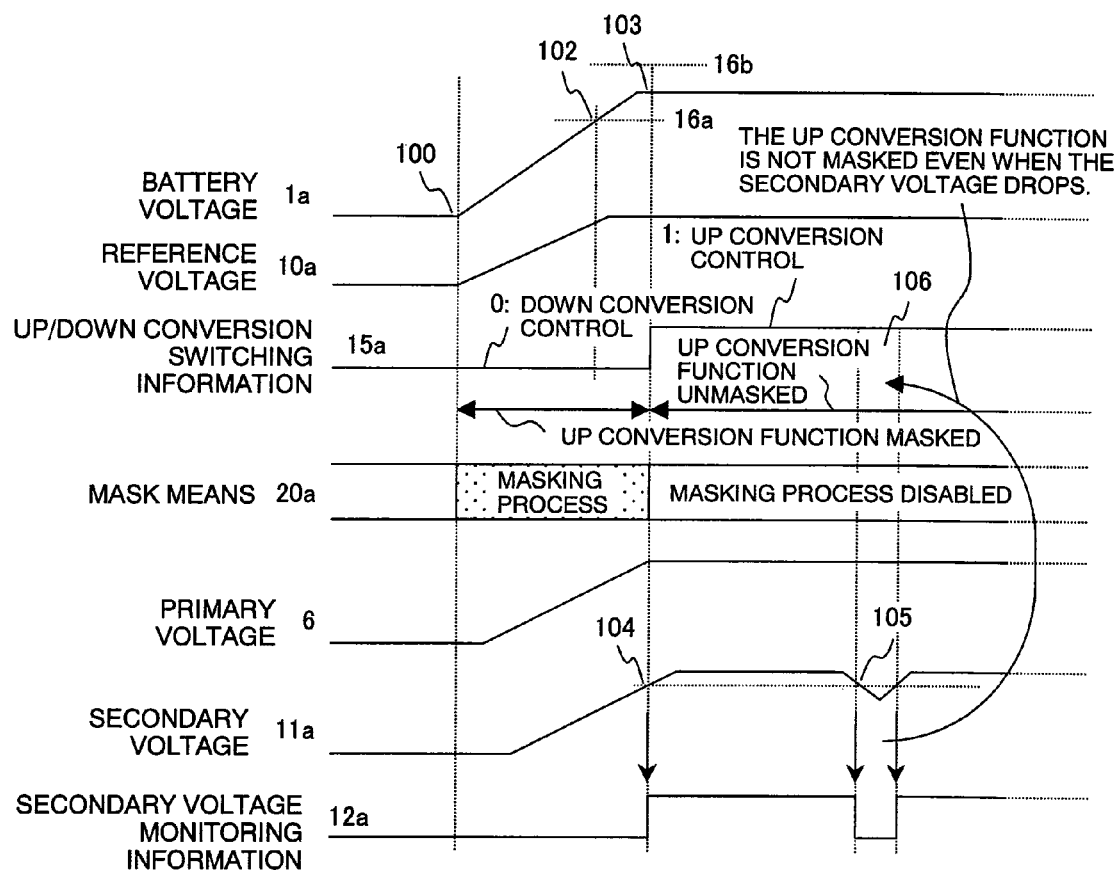
FIG. 5 is an operational waveform diagram according to the first embodiment of the invention.

FIG. 5 is an operational waveform diagram for voltages showing operations when up conversion control is applied to the battery voltage. The following describes operations when the secondary voltage decreases. In FIG. 5, the secondary voltage 11a temporarily drops for some reasons as indicated by reference numeral 105 and becomes lower than a regulation voltage 104. At this time, the secondary voltage monitoring information 12a is output as 0. As indicated by reference numeral 106 in FIG. 5, the mask means 20a does not perform an up conversion function masking process to keep the up/down conversion switching information 15a output as 1 (up conversion control notification). The primary voltage 6 is subject to no effect and can be supplied stably.

Fourth Embodiment

Figure 6:
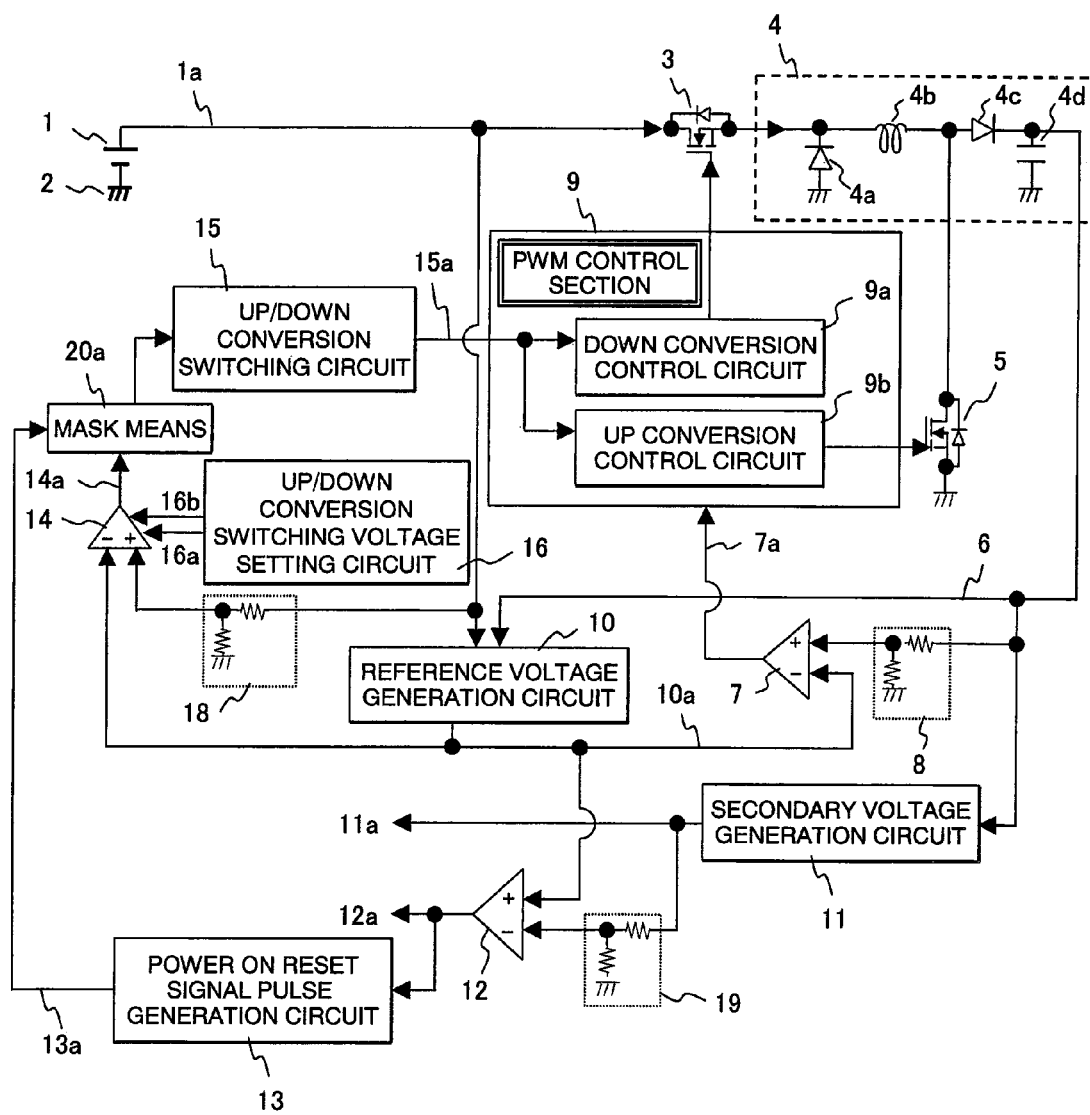
FIG. 6 is a circuit diagram showing a fourth embodiment of the invention.

FIG. 6 shows a fourth embodiment of the invention. In FIG. 6, a Power On Reset signal pulse generation circuit 13 initializes the devices providing the secondary voltage 11a by outputting a Power On Reset signal 13a to the devices based on the secondary voltage monitoring information 12a. The fourth embodiment uses the Power On Reset signal 13a so that the mask means disables up conversion control over the switching device for up conversion 5 while the battery voltage 1a is increasing.

The voltage comparator for battery voltage monitoring 14 monitors the battery voltage. It may be preferable to stop the voltage comparator for battery voltage monitoring 14 until the Power On Reset signal 13a is released. This stops control passed to the switching device for up conversion 5 and prevents the primary voltage 6 from abnormally rising.

Figure 7:
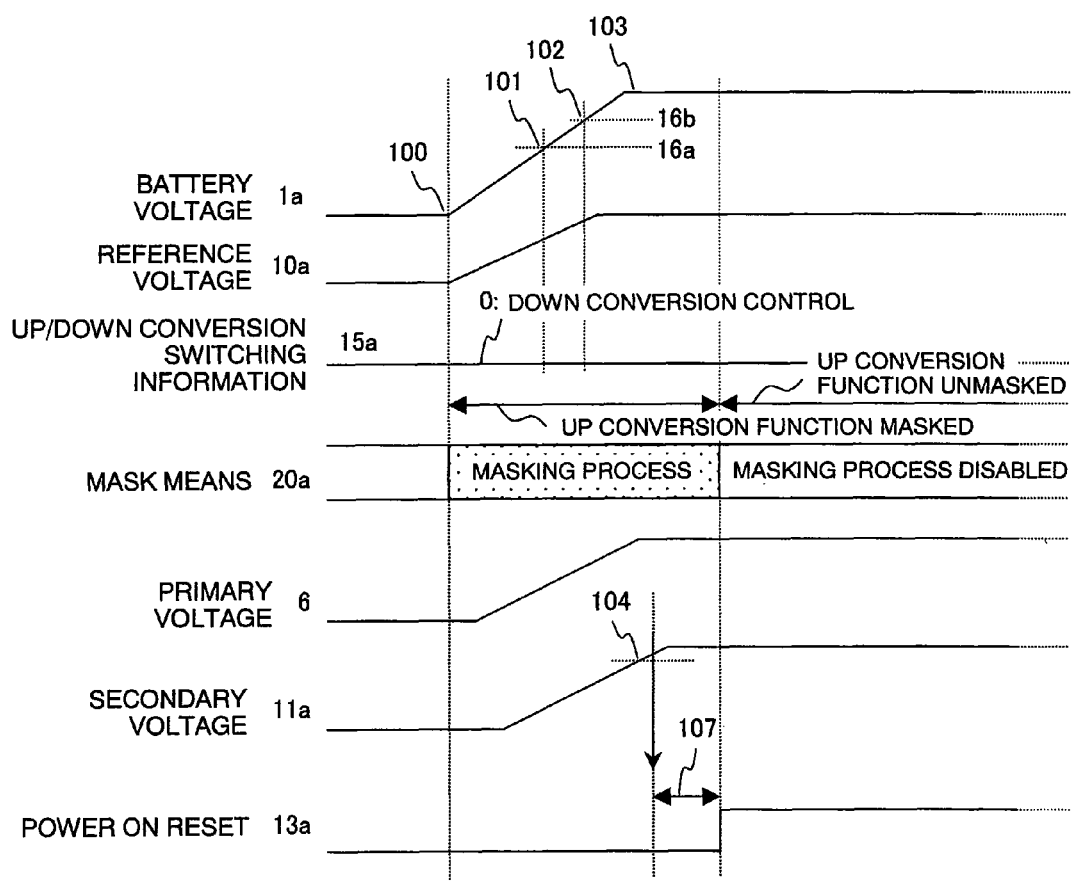
FIG. 7 is an operational waveform diagram according to the fourth embodiment of the invention.

FIG. 7 is an operational waveform diagram showing operations according to a fourth embodiment. Operations of the fourth embodiment will be described with reference to FIG. 7. With reference to FIG. 4, there have been described in detail the operations in which the battery voltage 1a reaches the voltage 103 and the secondary voltage 11a reaches the regulation value 104. Only differences will be described below. When the secondary voltage 11a is greater than or equal to the regulation value 104, the secondary voltage monitoring information 12a is output as 1. When a given interval 107 elapses after the secondary voltage monitoring information 12a is output as 1, the Power On Reset signal pulse generation circuit 13 transmits 1 as output 13a to the devices.

It is possible to prevent the primary voltage 6 from rising abnormally by keeping the up/down conversion switching information 15a being output as 0 (down conversion control notification) until the Power On Reset signal 13a is output as 1. The fourth embodiment controls the up conversion control operation by combining the conventionally used Power On Reset signal with no additional cost.

Figure 8:
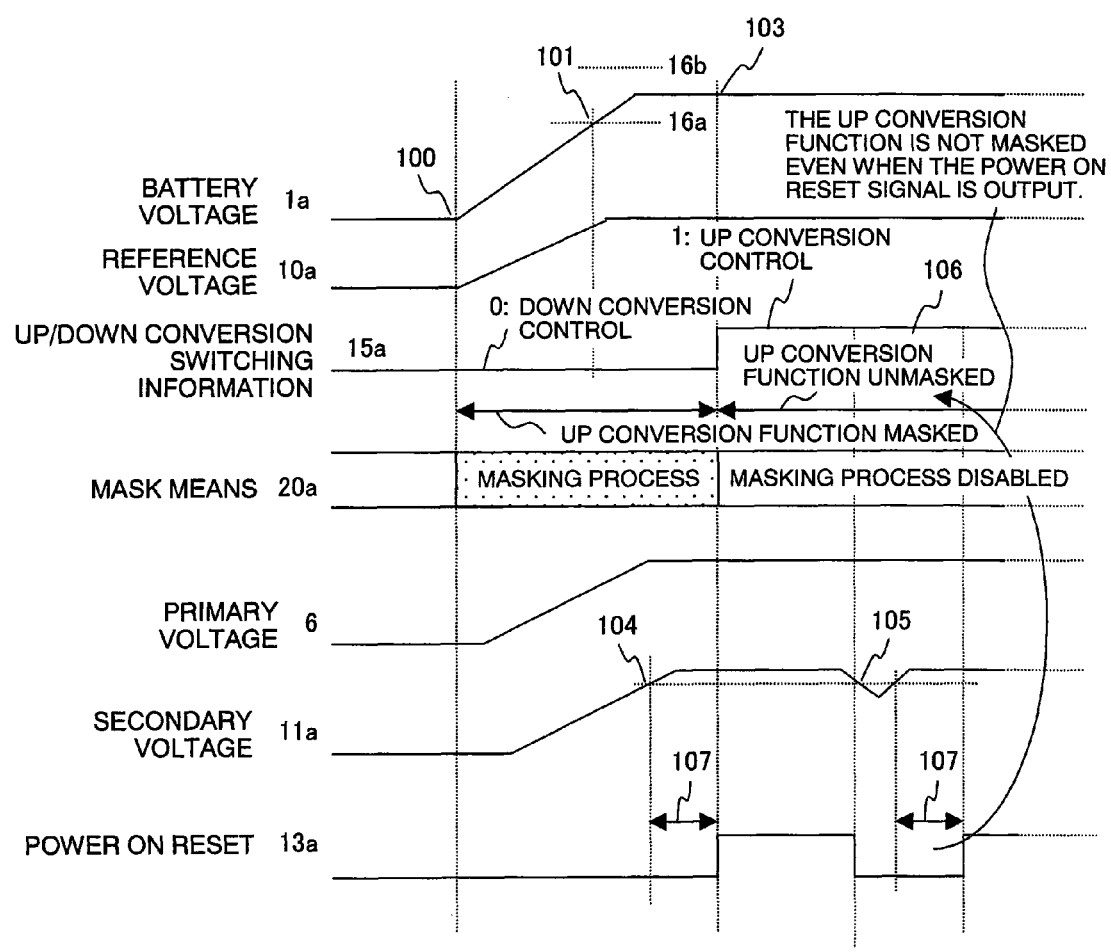
FIG. 8 is an operational waveform diagram according to the fourth embodiment of the invention.

FIG. 8 is an operational waveform diagram showing operations when the battery voltage is under the up conversion control according to the fourth embodiment in FIG. 7. The following describes operations when the secondary voltage temporarily drops and a Power On Reset signal is generated. The secondary voltage 11a temporarily drops for some_reasons as indicated by reference numeral 105 and becomes lower than the regulation voltage 104. At this time, the secondary voltage monitoring information 12a is output as 0 and the Power On Reset signal 13a is output as 0 for a given period 107. As indicated by reference numeral 106 in FIG. 8, the mask means 20a does not perform an up conversion function masking process to keep the up/down conversion switching information 15a output as 1 (up conversion control notification). The primary voltage 6 is subject to no effect and can be supplied stably.

Fifth Embodiment

Figure 9:
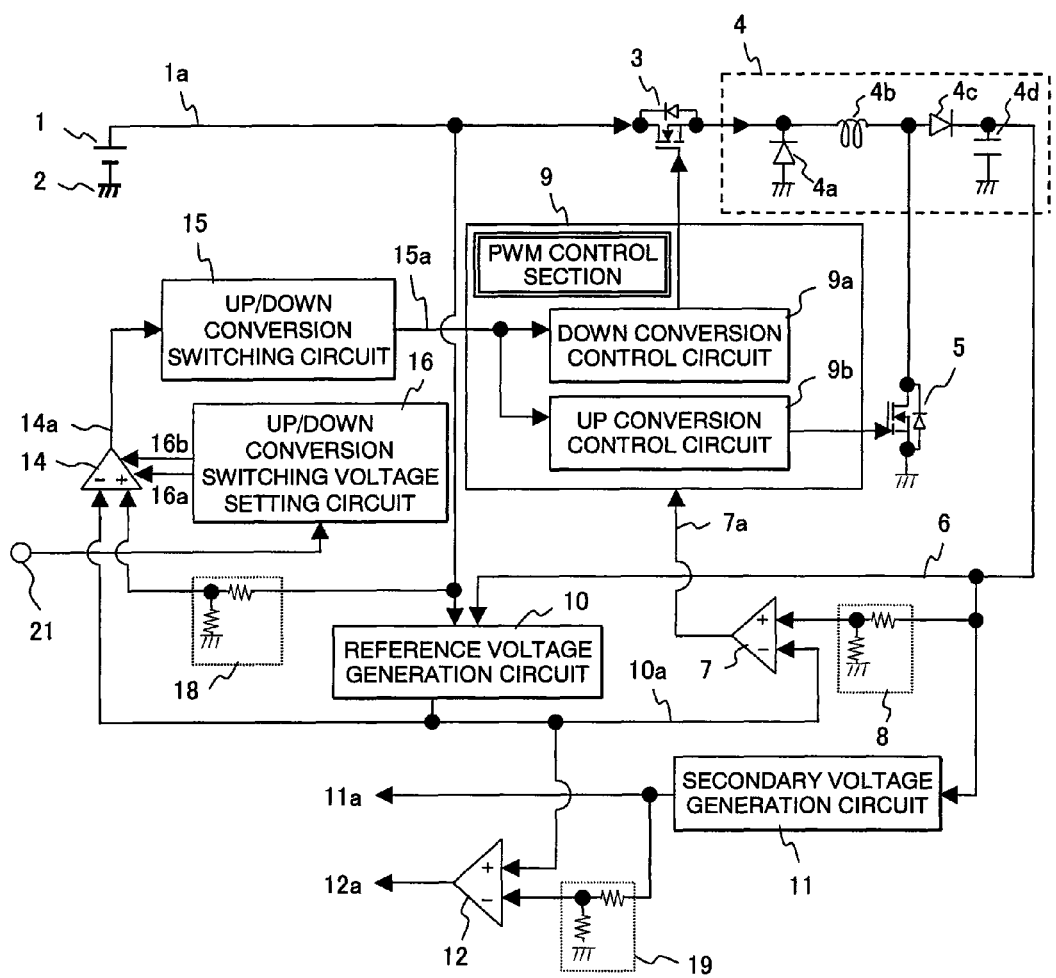
FIG. 9 is a circuit diagram showing a fifth embodiment of the invention.

FIG. 9 shows a fifth embodiment of the invention. The embodiment concerns a case where the battery voltage 1a recovers to the down conversion switching voltage 16b or higher after the battery voltage 1a decreases to the up conversion switching voltage 16a and changes to the up conversion control from the down conversion control as described in the preceding embodiments. When the battery voltage 1a reaches the up conversion switching voltage 16a or lower, the voltage comparator for battery voltage monitoring 14 outputs the up/down conversion switching information 15a set to 1 (up conversion control notification). The up conversion control circuit 9b operates to generate the primary voltage 6. However, the up conversion control circuit 9b in the PWM control section 9 controls the switching device for up conversion 5 and increases a current from the battery 1. The battery voltage 1a ripples due to an impedance of the connected harness.

A hysteresis voltage width is provided between the up conversion switching voltage 16a and the down conversion switching voltage 16b so as to prevent the voltage comparator for battery voltage monitoring 14 from erratically functioning due to the rippling battery voltage 1a. The battery voltage 1a may cause a ripple voltage greater than or equal to a voltage difference specified by the up/down conversion switching voltage setting circuit 16 under an operating environment such as an impedance of the harness to be used or a consumption current for the primary voltage. As a result, the voltage comparator for battery voltage monitoring 14 may malfunction. The embodiment uses a hysteresis changeover signal 21 so that the hysteresis voltage width in the up/down conversion switching voltage setting circuit 16 is variable. The hysteresis changeover signal 21 prevents an effect of the ripple voltage from the battery voltage 1a near the down conversion switching voltage 16b or the up conversion switching voltage 16a.

The hysteresis changeover signal 21 also prevents an unstable up/down conversion switching operation and can stably generate the primary voltage 6.

Sixth Embodiment

Figure 10:
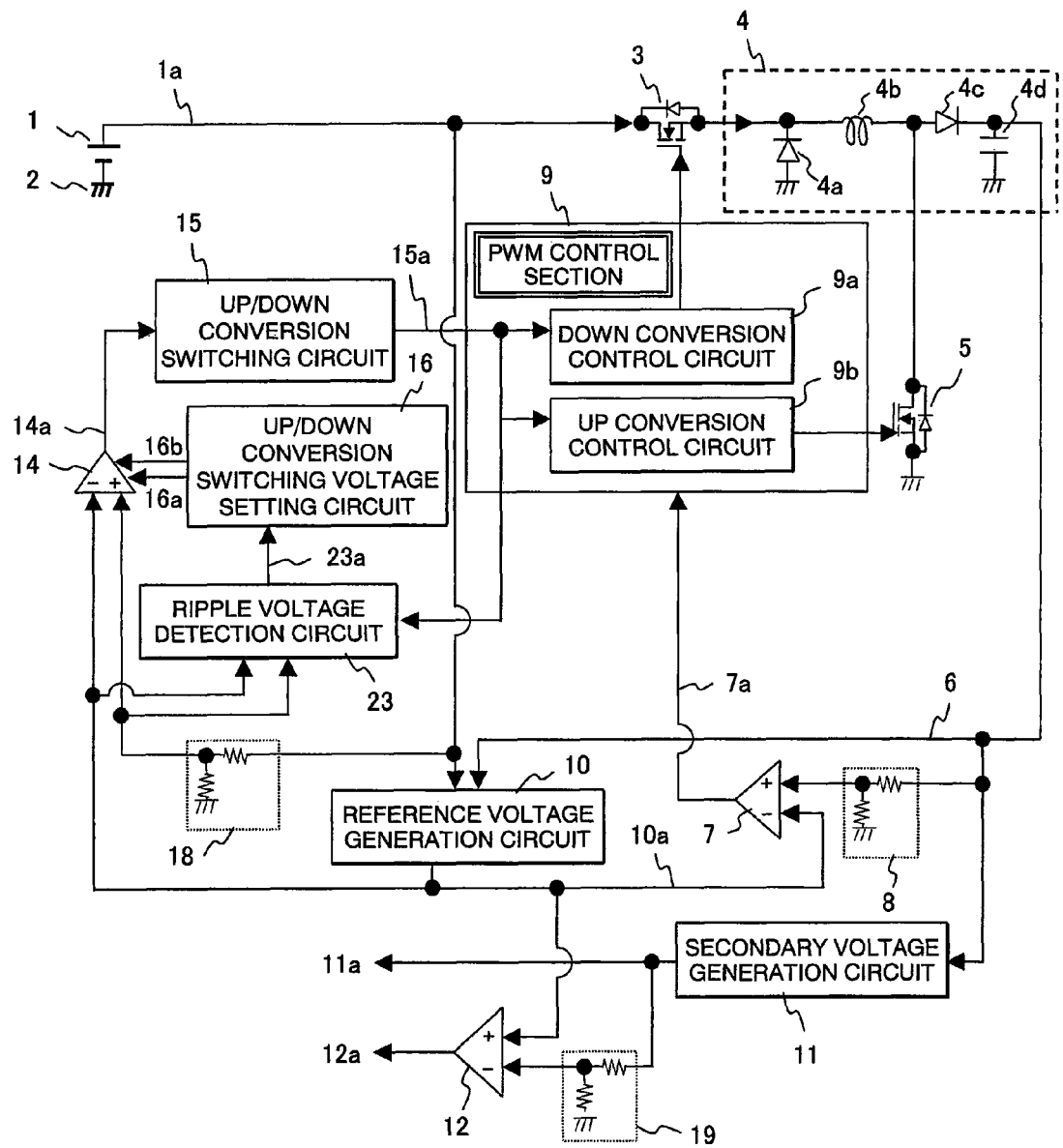
FIG. 10 is a circuit diagram showing a sixth embodiment of the invention.

FIG. 10 shows a sixth embodiment of the invention. The embodiment concerns a case where the battery voltage 1a decreases to the up conversion switching voltage 16a, changes to the up conversion control from the down conversion control, and then recovers to the down conversion switching voltage 16b or higher. In FIG. 10, a ripple voltage detection circuit 23 is used to monitor a ripple width of the battery voltage 1a. This is because the battery voltage 1a ripples variously depending on operational conditions under the up conversion control.

The ripple voltage detection circuit 23 uses the up/down conversion switching information 15a to detect a ripple voltage width during the up conversion control and notifies detected ripple voltage detection information 23a to the up/down conversion switching voltage setting circuit 16. Using the ripple voltage detection information 23a, the up/down conversion switching voltage setting circuit 16 changes a voltage difference between the down conversion switching voltage 16b and the up conversion switching voltage 16a specified as initial values to a hysteresis width compliant with the operational environment. The construction can prevent the battery voltage monitoring information 14a from erratically varying due to the rippling battery voltage 1a, prevent an unstable up/down conversion switching operation, and stably generate the primary voltage 6.

Figure 11:
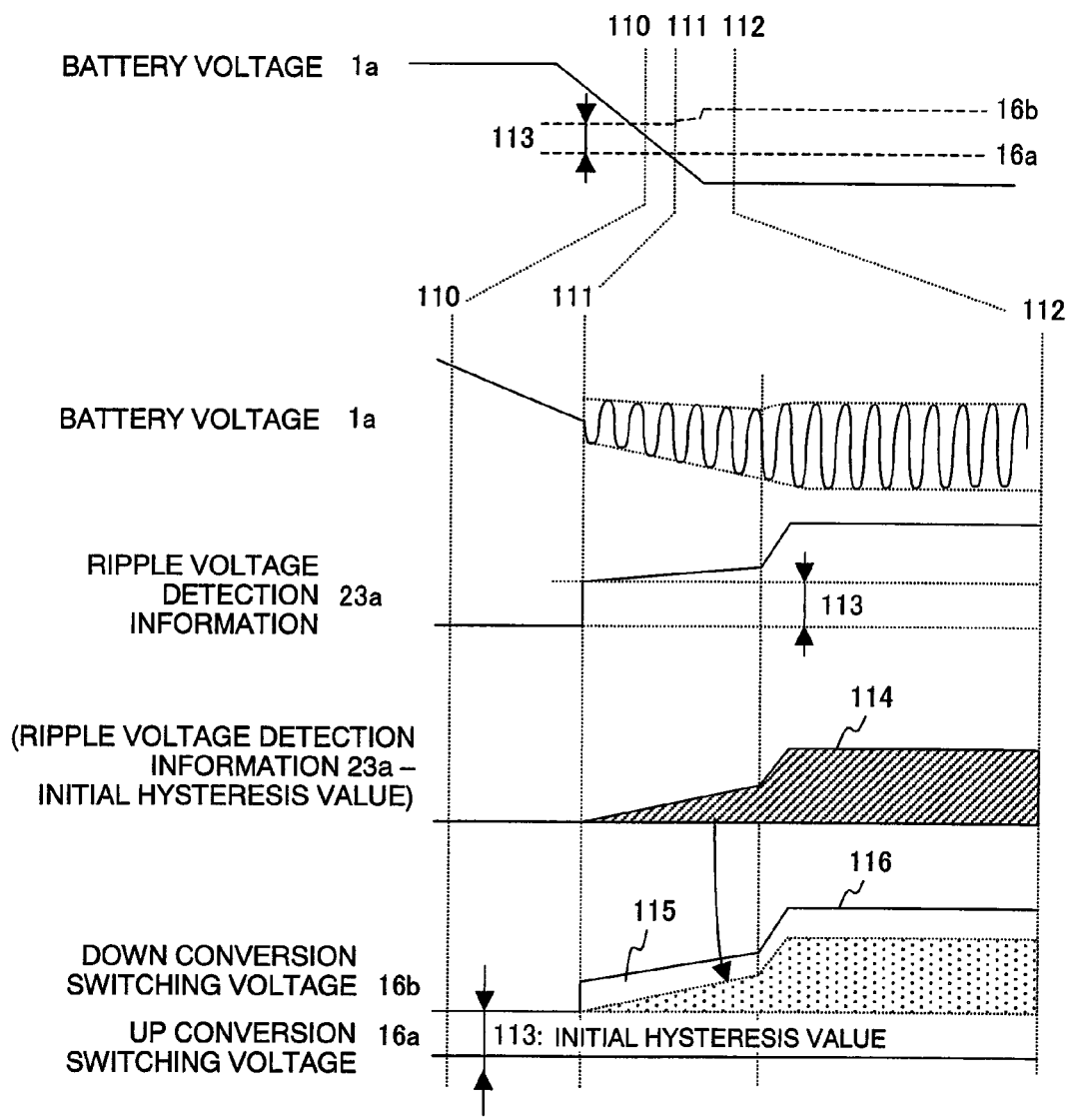
FIG. 11 is an operational waveform diagram according to the sixth embodiment of the invention.

FIG. 11 is an operational waveform diagram showing operations of the sixth embodiment. The sixth embodiment will be described with reference to FIG. 11. When the battery voltage 1a becomes smaller than or equal to the up conversion switching voltage 16a as indicated by reference numeral 111, the battery voltage 1a ripples while the up conversion control circuit 9b in the PWM control section 9 controls the switching device for up conversion 5. The ripple voltage detection circuit 23 detects a voltage difference and outputs a ripple voltage width as ripple voltage detection information 23a.

The up/down conversion switching voltage setting circuit 16 compares the ripple voltage detection information 23a with a hysteresis voltage as an initial value 113 settled based on the ripple voltage detection information 23a. As indicated by reference numeral 114, the up/down conversion switching voltage setting circuit 16 detects ripple voltage values exceeding the predetermined initial value 113 and varies the threshold from the initial value for the down conversion switching voltage 16b. Further, the up/down conversion switching voltage setting circuit 16 can use a function that adds a value 115 for preventing an error and changes the down conversion switching voltage 16b to a hysteresis width compliant with the operational environment as indicated by reference numeral 116. The construction can prevent the battery voltage monitoring information 14a from erratically varying due to the rippling battery voltage 1a, prevent an unstable up/down conversion switching operation, and stably generate the primary voltage 6.

Seventh Embodiment

Figure 12:
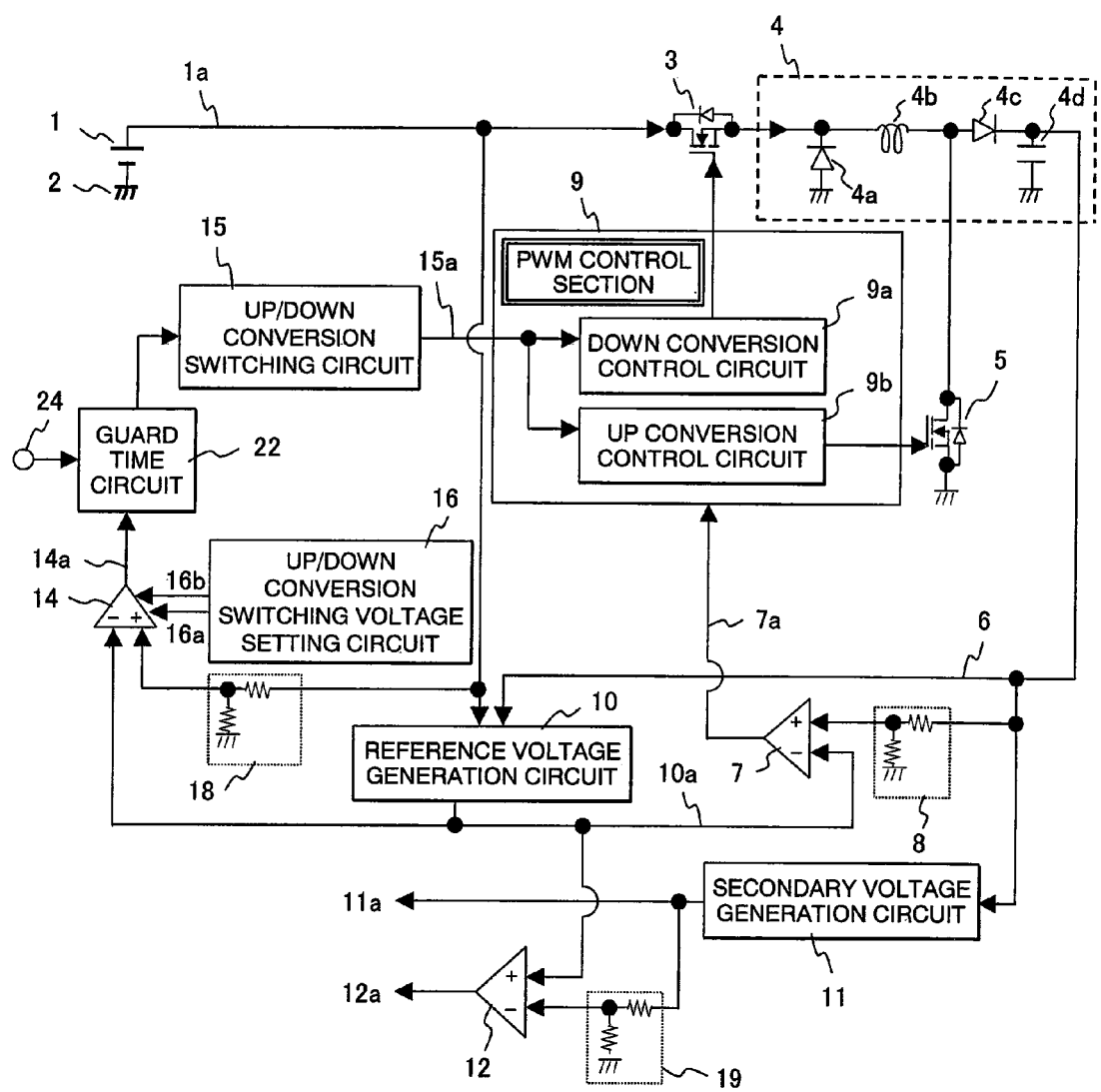
FIG. 12 is a circuit diagram showing a seventh embodiment of the invention.

FIG. 12 shows a seventh embodiment of the invention. The embodiment concerns a case where the battery voltage 1a decreases to the up conversion switching voltage 16a, changes to the up conversion control from the down conversion control, and then recovers to the down conversion switching voltage 16b or higher. When the battery voltage 1a causes a ripple greater than or equal to the hysteresis width specified by the up/down conversion switching voltage setting circuit 16, the voltage comparator for battery voltage monitoring 14 erratically detects a voltage change. The up/down conversion switching circuit 15 erratically passes changeover control to the PWM control section 9.

To solve the problem, a guard time circuit 22 is used to provide guard time for keeping the battery voltage monitoring information 14a output for a given period of time. The voltage comparator for battery voltage monitoring 14 detects and outputs the battery voltage monitoring information 14a. The construction can prevent an unstable up/down conversion switching operation and stably generate the primary voltage 6.

Further, the guard time circuit 22 can be provided with a guard time changeover function using a guard time changeover signal 24 supplied from the outside so as to be able to change the guard time in accordance with the operational environment. It is possible to prevent an unstable up/down conversion switching operation and stably generate the primary voltage 6.

Eighth Embodiment

Figure 13:
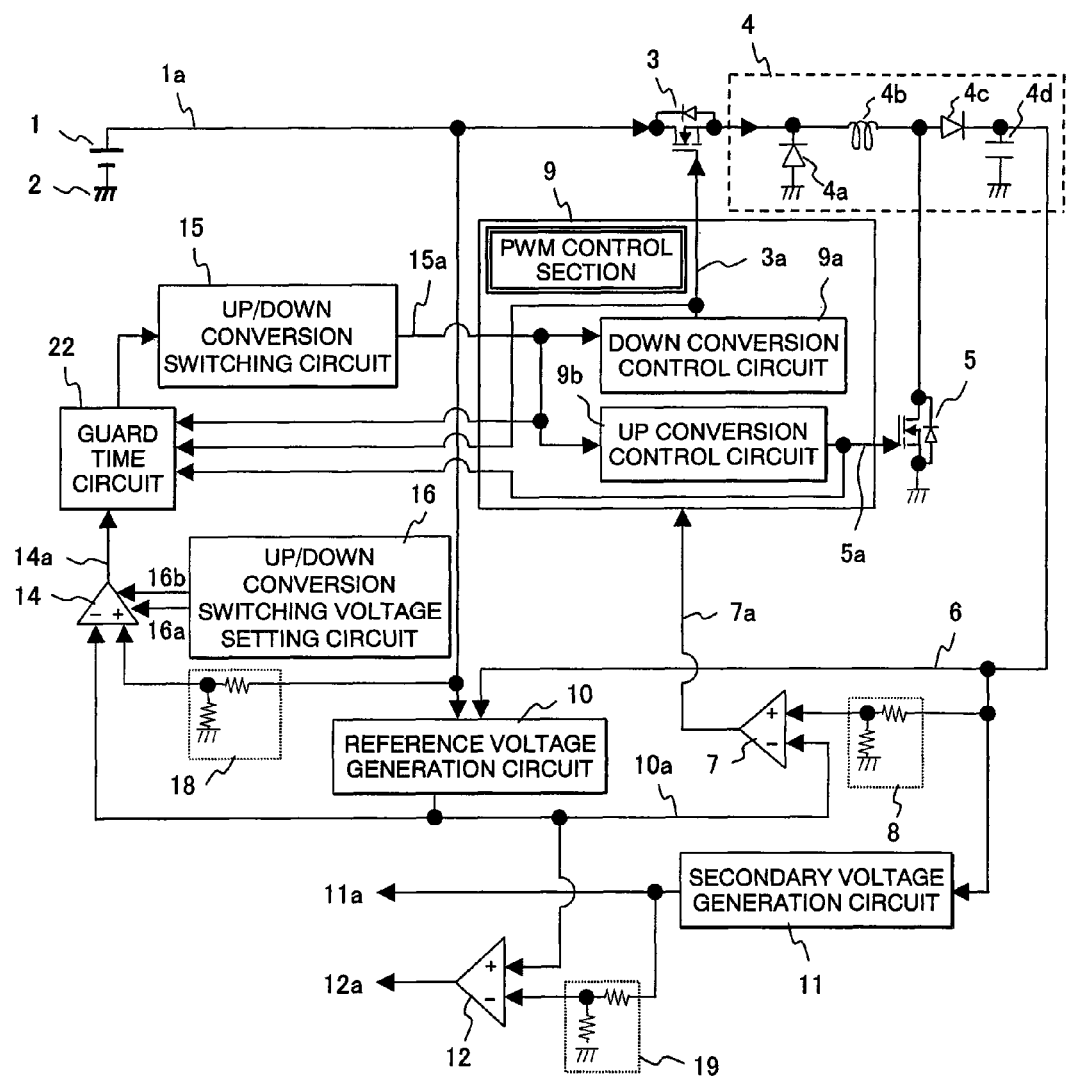
FIG. 13 is a circuit diagram showing an eighth embodiment of the invention.

FIG. 13 concerns the guard time described with reference to FIG. 12 and shows an eighth embodiment of the invention having a construction of calculating the guard time from the PWM control information. Since the battery voltage 1a ripples during the up conversion control, the guard time circuit 22 detects control duty time from control signals using the up/down conversion switching information 15a, a down conversion control signal 3a, and an up conversion control signal 5a. The guard time circuit 22 generates guard time from the detected time and provides the guard time for the battery voltage monitoring information 14a detected by the voltage comparator for battery voltage monitoring 14. The construction can prevent an unstable up/down conversion switching operation and stably generate the primary voltage 6.

Figure 14:
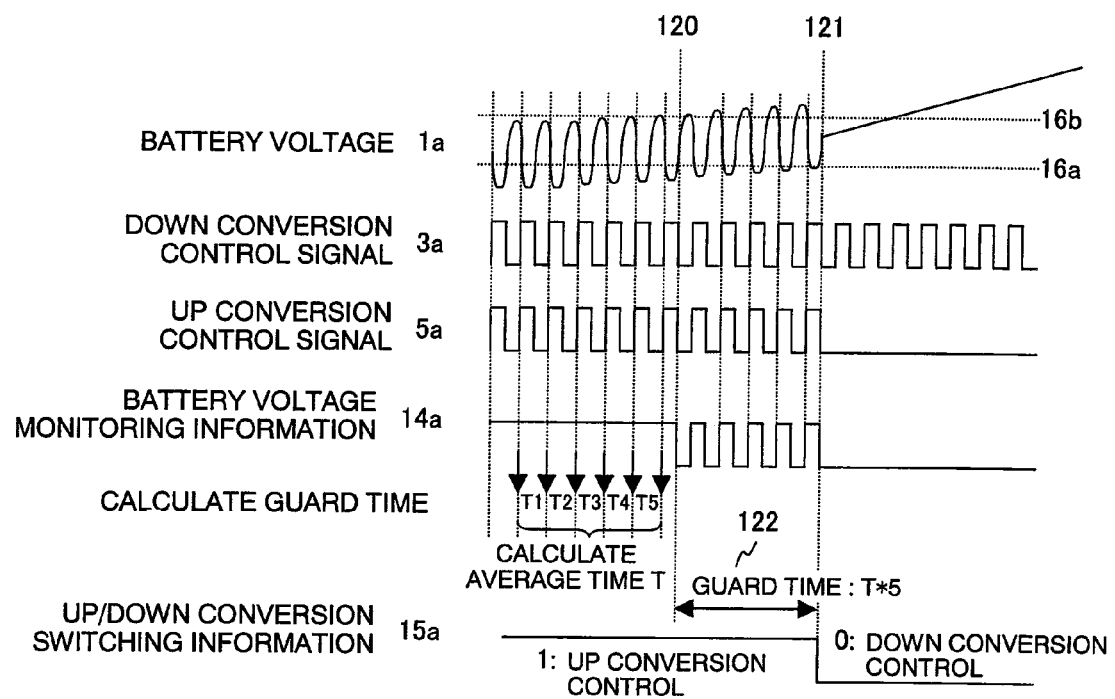
FIG. 14 is an operational waveform diagram according to the sixth embodiment of the invention.

FIG. 14 is an operational waveform diagram showing operations of the eighth embodiment. The eighth embodiment will be described with reference to FIG. 14. While the battery voltage 1a ripples, the guard time circuit 22 detects guard times T1 through T5 from the down conversion control signal 3a and the up conversion control signal 5a under the up conversion control in process. The guard time circuit 22 calculates an average time value for five cycles of the detected time and settles five cycles of the average value as a guard time 122.

The voltage comparator for battery voltage monitoring 14 erratically detects a voltage when the battery voltage 1a causes a ripple greater than or equal to the hysteresis width near the up conversion switching voltage 16a or the down conversion switching voltage 16b. At a time point 120 in FIG. 14, the embodiment provides guard time 122 for the battery voltage monitoring information 14a detected by the voltage comparator for battery voltage monitoring 14. It is possible to prevent an unstable up/down conversion switching operation and stably generate the primary voltage 6. The embodiment has described the guard time setting as an example only and does not limit a specific means. The embodiment automatically extracts the guard time from the PWM control information and generates the guard time.

Ninth Embodiment

Figure 15:
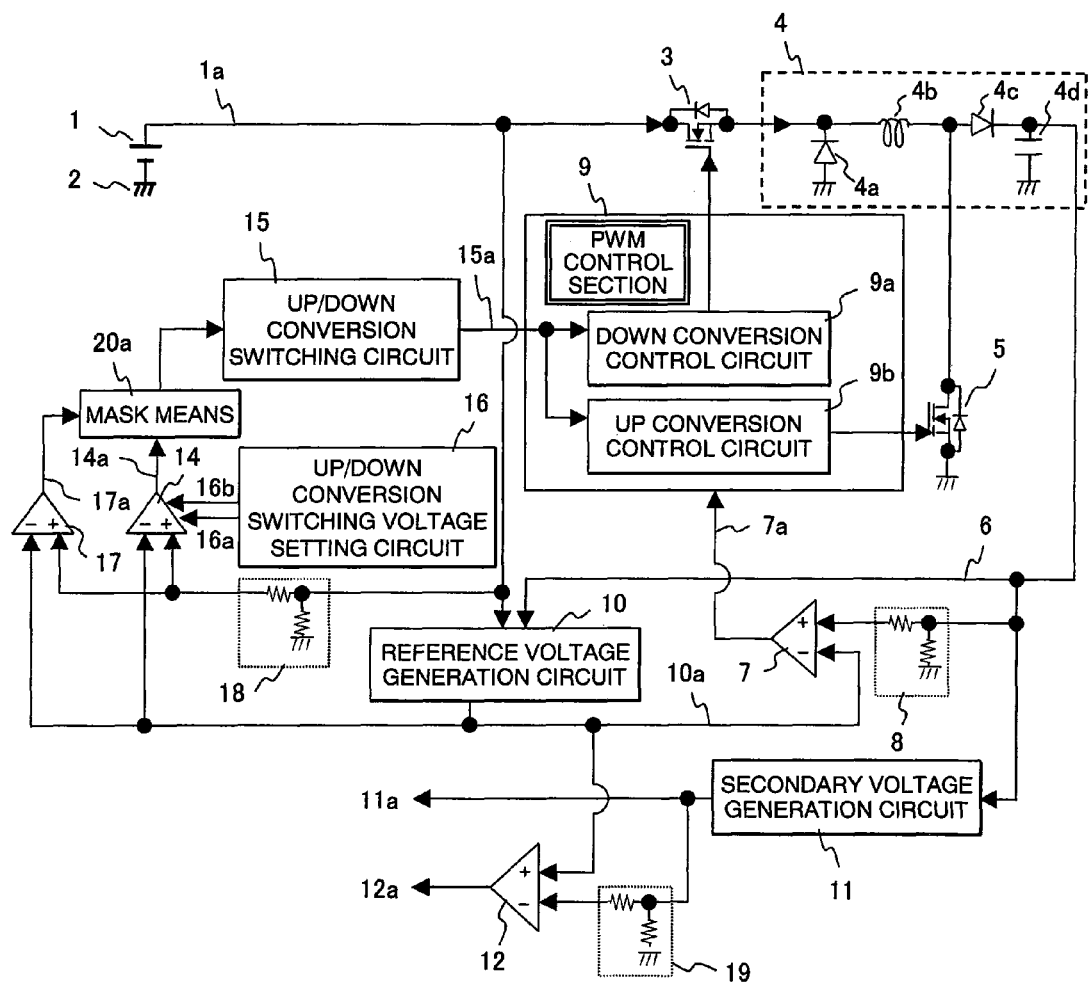
FIG. 15 is a circuit diagram showing a ninth embodiment of the invention.

FIG. 15 shows a ninth embodiment of the invention when the battery is removed. As described in the preceding embodiments, a decrease in the battery voltage 1a also decreases the primary voltage 6 or the reference voltage 10a. The voltage comparator for primary voltage monitoring 7 or the voltage comparator for battery voltage monitoring 14 cannot correctly monitor voltage levels. This makes it impossible to normally control the down conversion control circuit 9a or the up conversion control circuit 9b in the PWM control section 9, thus abnormally increasing the primary voltage. To solve the problem, a voltage comparator for low voltage monitoring 17 monitors a low voltage in the battery voltage 1a. Before a low voltage causes abnormal control, low voltage monitoring information 17a allows the mask means 20a to stop controlling the switching device for up conversion 5 and prevent the primary voltage from abnormally rising. The mask means may be arranged as described in the second or third embodiment.

When detecting a low voltage in the battery, the embodiment stops the voltage comparator for battery voltage monitoring 14 for monitoring the battery voltage. As mentioned above, this stops controlling the switching device for up conversion 5 and prevents the primary voltage 6 from abnormally rising. It is known that a large current is needed to step up the battery voltage when decreased. Decreasing the battery voltage requires a large current for generating the primary voltage and destroys a switching regulator device as a result. The embodiment can prevent the device from being destroyed.

Figure 16:
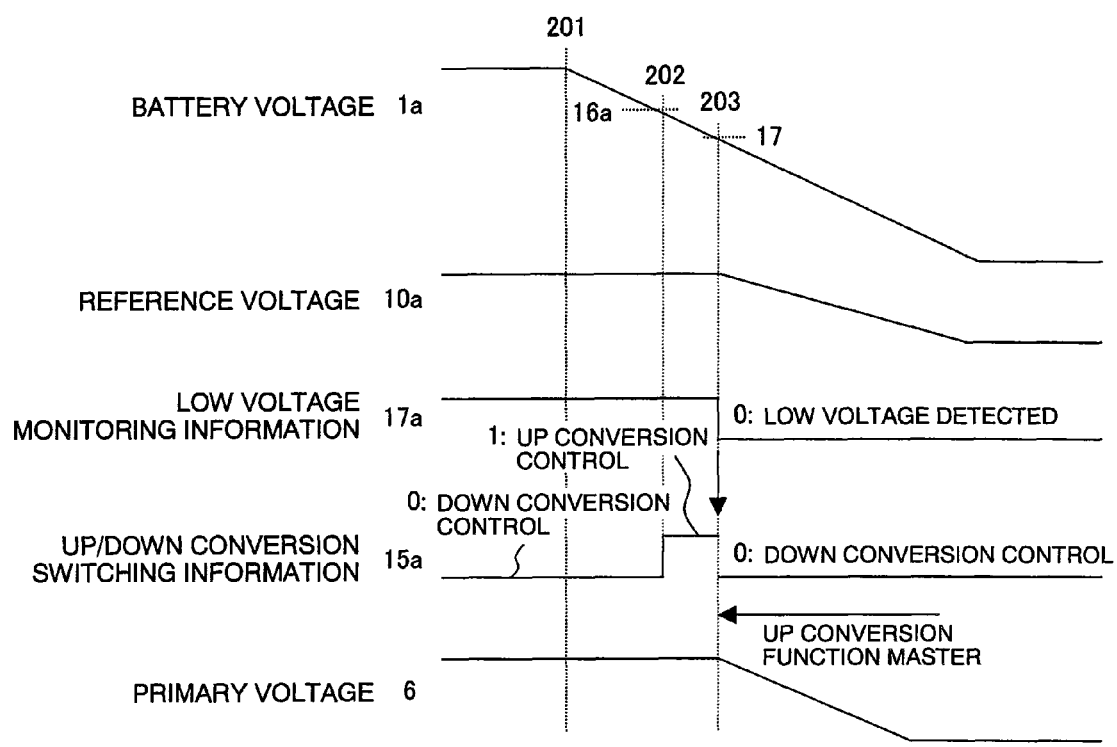
FIG. 16 is an operational waveform diagram according to the ninth embodiment of the invention.

FIG. 16 is an operational waveform diagram showing operations of the ninth embodiment. The following describes operations when the battery voltage decreases. The battery voltage 1a decreases because the battery 1 is removed at timing 201. The battery voltage 1a is smaller than or equal to the up conversion switching voltage 16a at a time point 202. The up/down conversion switching information 15a is output as 1 (up conversion control notification) for up conversion control. When the battery voltage 1a decreases to a specified voltage 17 or lower as indicated by reference numeral 203, the low voltage monitoring information 17a is output as 0 (low voltage detection notification). This keeps the up/down conversion switching information 15a being output as 0 (down conversion control notification) to stop controlling the switching device for up conversion 5 and prevent the primary voltage from abnormally rising.

Tenth Embodiment

Figure 17:
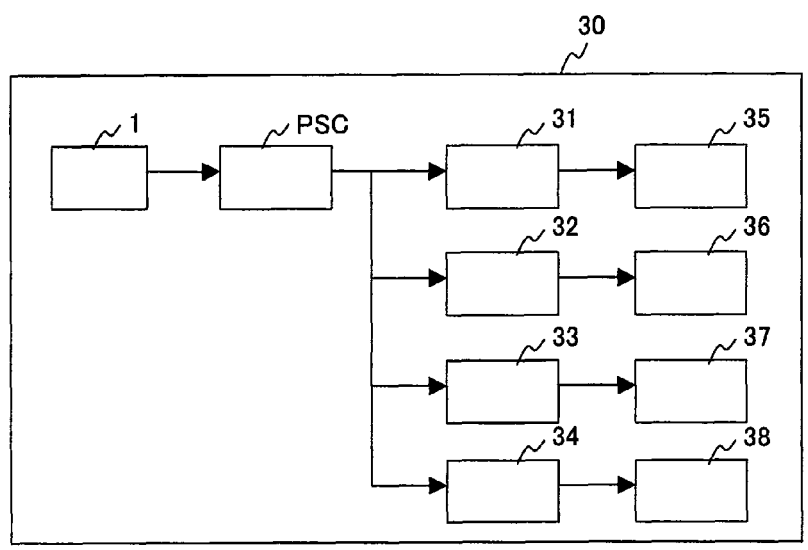
FIG. 17 is a block diagram showing a tenth embodiment of the invention.
Figure 18:
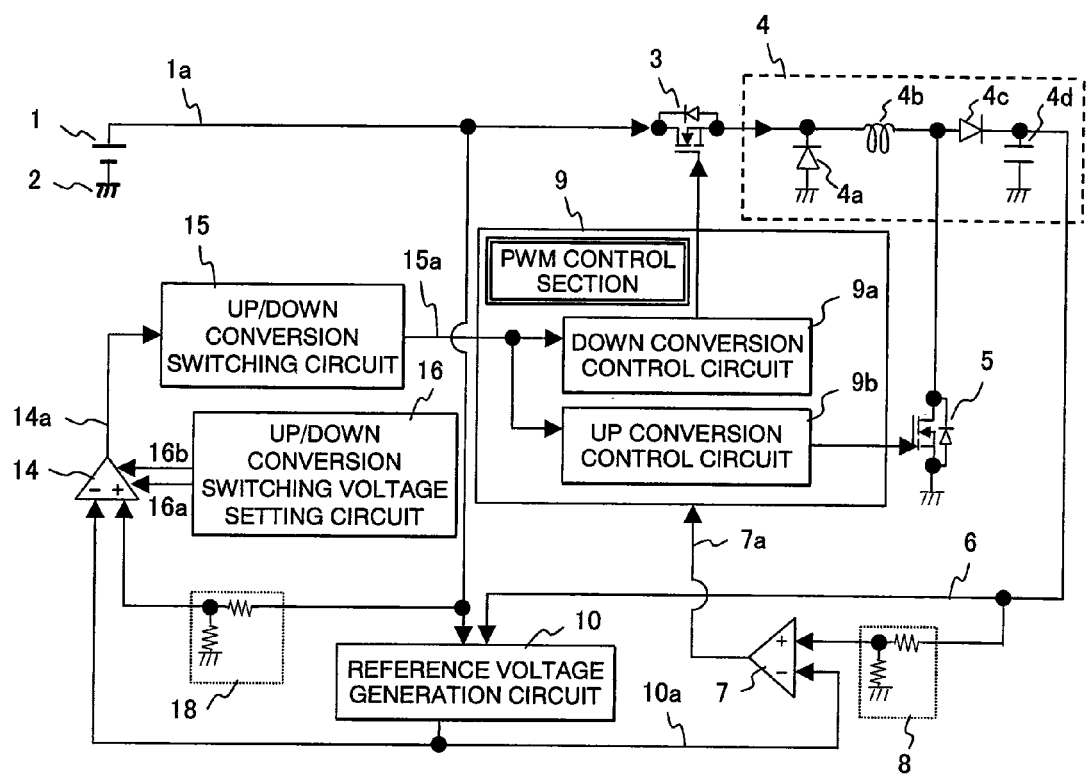
FIG. 18 is a circuit diagram showing a prior art.
Figure 19:
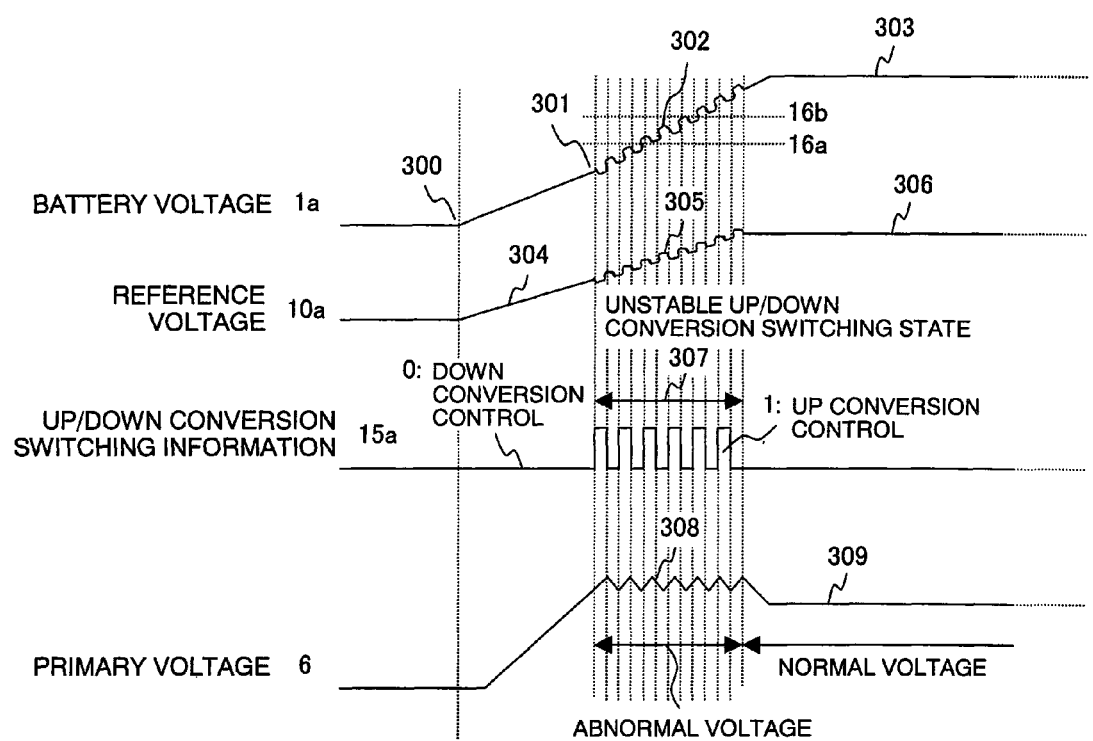
FIG. 19 is an operational waveform diagram according to the prior art when a battery voltage increases.
Figure 20:
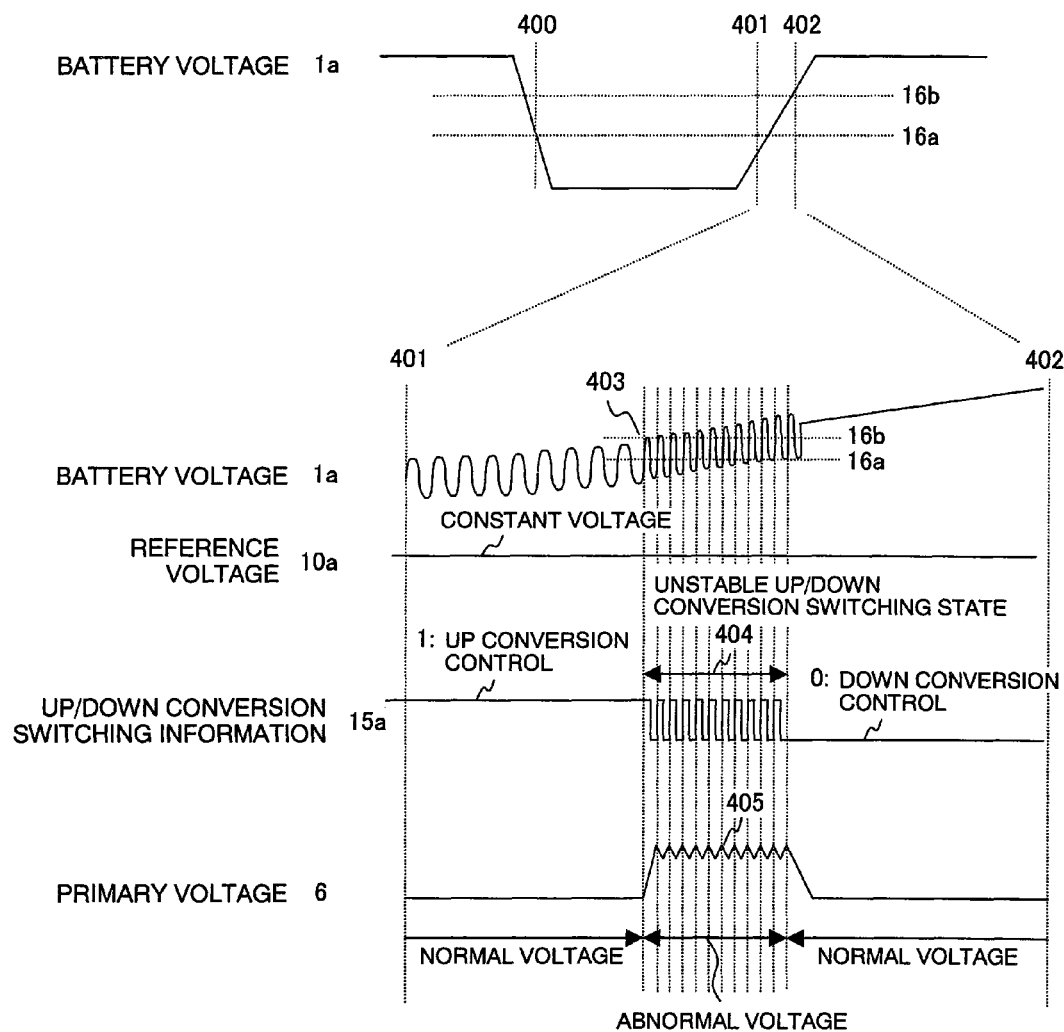
FIG. 20 is an operational waveform diagram according to the prior art when a decreased battery voltage recovers.
Figure 21:
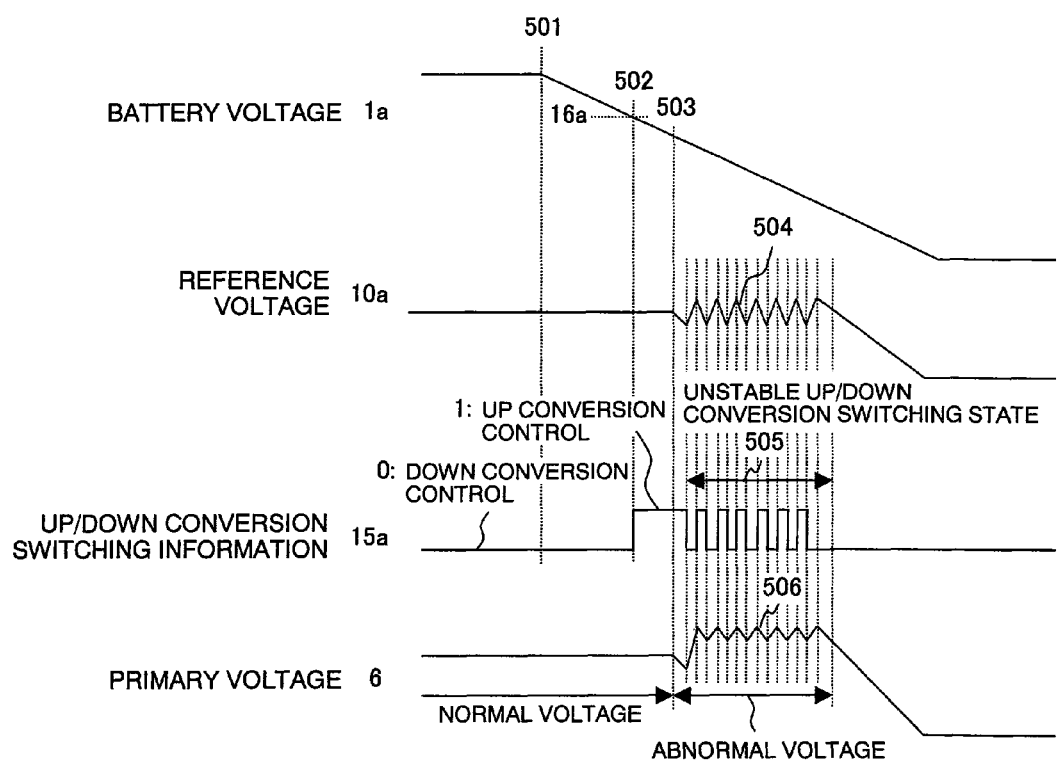
FIG. 21 is an operational waveform diagram according to the prior art when a battery voltage decreases.

FIG. 17 is a tenth embodiment of mounting the power supply controller according to the invention on a mechanical apparatus such as a car. FIG. 17 shows a car 30 mounted with a power supply control circuit (PSC) as the power supply controller according to the invention. The car 30 includes constituent devices such as an engine 35, a steering unit 36, a lighting system 37, and a brake system 38. The car 30 further includes an engine control means 31, a steering control means 32, a lighting control means 33, and a brake system control means 34 for controlling the devices. The device control means are stably supplied with operating voltages from the power supply controller according to the invention.

What is claimed is:

1. A power supply controller comprising:
   an up conversion means for stepping up a primary voltage from a battery voltage generated on a circuit of the power supply controller after connecting with a battery;
   a battery voltage detection means; and
   an up conversion stop means for allowing the up conversion means to stop stepping up a voltage until a secondary voltage reaches a regulation value provided to judge when the secondary voltage supplied to each device of a controlled apparatus exceeds an operating voltage;
   wherein the power supply controller generates a secondary voltage provided to each said device of the controlled apparatus from a generated primary voltage.

2. A power supply controller comprising:
   a down conversion means for stepping down a primary voltage from a battery voltage generated on a circuit of the power supply controller after connecting with a battery;
   an up conversion means for stepping up a primary voltage from a battery voltage;
   a battery voltage detection means; and
   an up conversion stop means for allowing the up conversion means to stop stepping up a voltage until a secondary voltage reaches a regulation value provided to judge when the secondary voltage supplied to each device of a controlled apparatus exceeds an operating voltage;
   wherein the power supply controller generates a secondary voltage provided to each said device of the controlled apparatus from a generated primary voltage.

3. A power supply controller comprising:
   an up conversion means for stepping up a primary voltage from a battery voltage;
   a battery voltage detection means; and
   an up conversion stop means for allowing the up conversion means to stop stepping up a voltage until a secondary voltage reaches a regulation value;
   wherein the power supply controller generates a secondary voltage from a generated primary voltage; and
   wherein the battery voltage detection means includes an up conversion stop means for stopping battery voltage detection and an up conversion operation until the secondary voltage reaches a regulation voltage.

4. A power supply controller comprising:
   an up conversion means for stepping up a primary voltage from a battery voltage;
   a secondary voltage generation means for generating a secondary voltage from a generated primary voltage;
   a Power On Reset signal generation means for supplying a Power On Reset signal to the secondary voltage generation means;
   a battery voltage detection means; and
   an up conversion stop means for stopping an up conversion operation until the Power On Reset signal is released.

5. The power supply controller according to claim 4, wherein the battery voltage detection means includes an up conversion stop means for stopping battery voltage detection and an up conversion operation until a secondary voltage reaches a regulation voltage and a Power On Reset signal is released.

6. The power supply controller according to claim 4, comprising:
   an up conversion stop means for keeping an up conversion function enabled in accordance with a Power On Reset signal after a secondary voltage reaches a regulation voltage, the up conversion function is enabled after release of the Power On Reset signal, and the secondary voltage becomes lower than the predetermined voltage.

7. The power supply controller according to claim 4, comprising:
   a reference voltage generation means for generating a reference voltage from a battery voltage or a primary voltage whichever is higher;
   a voltage maintaining means for maintaining a predetermined voltage even when a battery voltage decreases; and an up conversion stop means for stopping an up conversion operation until a Power On Reset signal is released.

8. A power supply controller comprising:
a down conversion means for stepping down a primary voltage from a battery voltage;
an up conversion means for stepping up a primary voltage from a battery voltage;
a secondary voltage generation means for generating a secondary voltage from a generated primary voltage;
a Power On Reset signal generation means for providing a Power On Reset signal to the secondary voltage generation means;
a battery voltage detection means; and
an up conversion stop means for stopping an up conversion operation until the Power On Reset signal is released.

9. A power supply controller comprising:
an up conversion means for stepping up a primary voltage from a battery voltage;
a battery voltage detection means; and
an up conversion stop means for allowing the up conversion means to stop stepping up a voltage until a secondary voltage reaches a regulation value, and for keeping an up conversion function enabled after the secondary voltage reaches a regulation voltage, an up conversion function is enabled, and the secondary voltage becomes lower than a predetermined voltage;
wherein the power supply controller generates a secondary voltage from a generated primary voltage.

10. A power supply controller comprising:
a battery voltage detection means;
an up conversion means for stepping up a primary voltage from a battery voltage to a predetermined voltage even when the battery voltage decreases to the primary voltage or lower; and
an up conversion stop means for allowing the up conversion means to stop stepping up a voltage until a secondary voltage reaches a regulation value;
wherein the power supply controller generates the secondary voltage from a generated primary voltage.

11. A power supply controller comprising:
an up conversion means for stepping up a primary voltage from a battery voltage;
a battery voltage detection means;
a reference voltage generation means for generating a reference voltage from a battery voltage or a primary voltage, whichever is higher;
a voltage maintaining means for maintaining a predetermined voltage even when a battery voltage decreases; and
an up conversion stop means for stopping an up conversion operation until secondary voltage reaches a regulation value and for allowing the up conversion means to stop stepping up a voltage until the secondary voltage reaches a regulation value;
wherein the power supply controller generates the secondary voltage from a generated primary voltage.

12. A power supply controller comprising:
an up conversion means for stepping up a primary voltage from a battery voltage;
a battery voltage detection means; and
an up conversion stop means for allowing the up conversion means to stop stepping up a voltage until a secondary voltage reaches a regulation value;
wherein the power supply controller generates a secondary voltage from a generated primary voltage;
wherein the up conversion means steps up a battery voltage when the battery voltage is smaller than or equal to a predetermined voltage; and
wherein the up conversion means stops stepping up the battery voltage when the battery voltage recovers to a predetermined voltage or higher.

13. A power supply controller comprising:
a down conversion means for stepping down a primary voltage from a battery voltage;
an up conversion means for stepping up a primary voltage from a battery voltage;
a battery voltage detection means;
a changeover means that changes the down conversion means to the up conversion means for stepping up a battery voltage when the battery voltage is smaller than or equal to a predetermined voltage and that changes the up conversion means to the down conversion means for stepping down the battery voltage when the battery voltage recovers to a predetermined voltage or higher; and
an up conversion stop means for allowing the up conversion means to stop stepping up a voltage until a secondary voltage reaches a regulation value;
wherein the power supply controller generates a secondary voltage from a generated primary voltage.

14. A power supply controller comprising:
an up conversion means for stepping up a primary voltage from a battery voltage;
a battery voltage detection means; and
an up conversion stop means for allowing the up conversion means to stop stepping up a voltage until a secondary voltage reaches a regulation value;
wherein the power supply controller generates a secondary voltage from a generated primary voltage; and
wherein the battery voltage detection means includes a hysteresis setup means for providing a hysteresis to a battery voltage detection value.

15. The power supply controller according to claim 14, wherein the battery voltage detection means includes a hysteresis varying means that uses an external control signal to assign a variable hysteresis to the battery voltage detection value.

16. The power supply controller according to claim 15, further comprising:
a ripple detection means for detecting a ripple width of a battery voltage; and
a hysteresis varying means for supplying a variable hysteresis used for battery voltage detection in accordance with the ripple width of the battery voltage.

17. A power supply controller comprising:
an up conversion means for stepping up a primary voltage from a battery voltage;
a battery voltage detection means; and
an up conversion stop means for allowing the up conversion means to stop stepping up a voltage until a secondary voltage reaches a regulation value;
wherein the power supply controller generates the secondary voltage from a generated primary voltage; and
wherein the battery voltage detection means includes a protection means for providing a given guard time for detection when the battery voltage is greater than or equal to or smaller than or equal to a predetermined voltage.

18. The power supply controller according to claim 17, wherein the protection means calculates a guard time from up conversion control information and makes the guard time variable when detecting a battery voltage greater than or equal to or smaller than or equal to a predetermined voltage.

19. A power supply controller comprising:
an up conversion means for stepping up a primary voltage from a battery voltage;
a battery voltage detection means for detecting a battery voltage; and
an up conversion stop means for allowing the up conversion means to stop stepping up a voltage until a secondary voltage reaches a regulation value, and
an up conversion stop means that provides a lower limit for a battery voltage capable of boost operation and stops an up conversion operation when detecting that a battery voltage is smaller than or equal to the lower limit;
wherein the power supply controller generates a secondary voltage from a generated primary voltage.

* * * * *